US011500521B2

(12) United States Patent
Liu

(10) Patent No.: US 11,500,521 B2
(45) Date of Patent: Nov. 15, 2022

(54) PAGE FORM, AND METHOD AND SYSTEM FOR SIMULTANEOUSLY INPUTTING PLURALITY OF PULL-DOWN MENUS

(71) Applicant: INSPUR SUZHOU INTELLIGENT TECHNOLOGY CO., LTD., Jiangsu (CN)

(72) Inventor: Yuting Liu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/632,000

(22) PCT Filed: Nov. 27, 2019

(86) PCT No.: PCT/CN2019/121111

§ 371 (c)(1), (2) Date: Feb. 1, 2022

(87) PCT Pub. No.: WO2021/022722

PCT Pub. Date: Feb. 11, 2021

(65) Prior Publication Data

US 2022/0317832 A1 Oct. 6, 2022

(30) Foreign Application Priority Data

Aug. 2, 2019 (CN) ........................ 201910712713.3

(51) Int. Cl.
*G06F 3/0482* (2013.01)
*G06F 9/451* (2018.01)

(52) U.S. Cl.
CPC ............ *G06F 3/0482* (2013.01); *G06F 9/451* (2018.02)

(58) Field of Classification Search
CPC .............................. G06F 3/0482; G06F 9/451
See application file for complete search history.

(56) References Cited

U.S. PATENT DOCUMENTS 10,268,768 B2 * 4/2019 Niu .................... G06F 16/9535
2007/0101280 A1 5/2007 Paoli et al.
2019/0129582 A1 * 5/2019 Uchiumi .............. G06F 16/168

FOREIGN PATENT DOCUMENTS

CN 104503669 A 4/2015
CN 105488123 A 4/2016
(Continued)

OTHER PUBLICATIONS

International Search Report and English Translation cited in PCT/CN2019/121111 dated Feb. 11, 2021, 6 pages.
(Continued)

*Primary Examiner* — Anil K Bhargava
(74) *Attorney, Agent, or Firm* — Cooper Legal Group LLC

(57) ABSTRACT

A page form, and a method and system for simultaneously inputting a plurality of pull-down menus. The method comprises: inputting a multi-pull-down menu simultaneous input request (110); analyzing the input multi-pull-down menu simultaneous input request to obtain all pull-down menus currently requiring input simultaneously and pull-down options required to be input in the pull-down menus respectively (120); and according to the analysis result, simultaneously selecting and inputting each pull-down menu obtained by analysis (130). According to the method, by completing simultaneous input of a plurality of pull-down menus at once, the working efficiency of consumers or users is improved, and the user experience is enhanced.

6 Claims, 3 Drawing Sheets

300 202 201
Please input the selection of a pull-down menu A1B2C3D4E5F6G1H2 submit
Pull-down menu A / Pull-down menu B / Pull-down menu C / Pull-down menu D / Pull-down menu E / Pull-down menu F / Pull-down menu G / Pull-down menu H
option 1 option 2 option 3 option 4 option 5 option 6

(56) References Cited

FOREIGN PATENT DOCUMENTS

| | | |
|---|---|---|
| CN | 108108249 A | 6/2018 |
| CN | 109582192 A | 4/2019 |
| CN | 109634492 A | 4/2019 |

OTHER PUBLICATIONS

First Office Action and English Translation cited in CN201910712713.3 dated Aug. 21, 2020, 7 pages.
Written Opinion and English Translation cited in PCT/CN2019/121111 dated Feb. 11, 2021, 5 pages.
Supplementary Search Report cited in CN201910712713.3 dated Sep. 22, 2020, 1 pages.
Notification to Grant Patent Right and English Translation for Invention of CN201910712713.3, dated Sep. 22, 2020, 3 pages.
First Search of CN201910712713.3 dated Aug. 21, 2020, 1 page.

* cited by examiner

PAGE FORM, AND METHOD AND SYSTEM FOR SIMULTANEOUSLY INPUTTING PLURALITY OF PULL-DOWN MENUS

CROSS-REFERENCE TO RELATED APPLICATIONS

The present application claims priority to Chinese Patent Application No. 201910712713.3, filed to the China Patent Office on Aug. 2, 2019, entitled "Page Form, and Method and System for Simultaneously Inputting Plurality of Pull-Down Menus", the contents of which are hereby incorporated by reference in its entirety.

TECHNICAL FIELD

The present application relates to the field of computers, and in particular, to a page form, and a method and system for simultaneously inputting a plurality of pull-down menus for completing input of a plurality of pull-down menus at once.

BACKGROUND ART

Modern electronic forms are often designed with a plurality of pull-down menus. In use, each pull-down menu is often provided with a corresponding number of pull-down options for a user to click, and an input function of the pull-down menu can be achieved by selecting one of the pull-down options.

However, when too many pull-down menus are designed on the same page for the user to click and input, the input process is relatively complicated, and the user needs to click each pull-down menu one by one. For example, a page form has n pull-down menus, each pull-down menu has m pull-down options available for selection, and the user needs to click through the n pull-down menus each time the user inputs, and to select an option from the m pull-down options of any one of the n pull-down menus each time the user clicks the pull-down menu. It can be seen that the user spends a lot of time in the clicking operation, which affects the working efficiency of the user.

In addition, when there are more pull-down menus, in addition to increasing the time for the user to click and input, the user is also easy to feel impatient and tired in operation, and the user is easy to cause information input errors due to tiredness, thereby affecting the user experience.

To this end, the present application provides a page form, and a method and system for simultaneously inputting a plurality of pull-down menus, which are used for solving the above problems.

SUMMARY OF THE INVENTION

In view of the technical problems existing in the prior art, the present application provides a page form, and a method and system for simultaneously inputting a plurality of pull-down menus, which are used for realizing the simultaneous input of a plurality of pull-down menus so as to improve the working efficiency of a user and enhance the user experience.

In a first aspect, the present application provides a method for simultaneously inputting a plurality of pull-down menus. The method is based on a group of pull-down menus. Each of the pull-down menus is provided with a corresponding number of pull-down options. Each of the pull-down menus is provided with identification information. The pull-down options of each of the pull-down menus are provided with identification information by one-to-one correspondence. The method for simultaneously inputting a plurality of pull-down menus includes:

inputting a multi-pull-down menu simultaneous input request, including identification information of each pull-down menu currently required to be input simultaneously, and identification information of corresponding pull-down options required to be input respectively in each pull-down menu currently required to be input simultaneously;

analyzing the input multi-pull-down menu simultaneous input request to obtain all pull-down menus currently required to be input simultaneously and pull-down options to be input respectively in the pull-down menus obtained by analysis; and simultaneously selecting and inputting each pull-down menu obtained by analysis according to the analysis result.

Further, the identification information of each pull-down menu is coded with a unique identification function.

The identification information of pull-down options of each pull-down menu is coded in a preset manner, and each pull-down option of the same pull-down menu has different identification information.

Further, the identification information of each pull-down menu is coded by any one or at least two of letters, numbers and other recognizable text symbols, and the identification information of each pull-down option is coded by any one or at least two of letters, numbers and other recognizable text symbols.

Further, before analyzing the input multi-pull-down menu simultaneous input request, the method for simultaneously inputting a plurality of pull-down menus also includes:

judging whether a format of the input multi-pull-down menu simultaneous input request is accurate:

yes, analyzing the input multi-pull-down menu simultaneous input request; and no, showing a user with prompt information indicating that the current multi-pull-down menu simultaneous input request is input erroneously. In a second aspect, the present application provides a system for simultaneously inputting a plurality of pull-down menus, including:

a pull-down menu module, including a group of pull-down menus, each provided with a corresponding number of pull-down options and identification information, the pull-down options of each pull-down menu being provided with identification information by one-to-one correspondence;

an input module, configured to input a multi-pull-down menu simultaneous input request, including identification information of each pull-down menu currently required to be input simultaneously, and identification information of corresponding pull-down options required to be input respectively in each pull-down menu currently required to be input simultaneously; and an analysis module, connected to the input module and the pull-down menu module respectively, and configured to analyze the multi-pull-down menu simultaneous input request input by the input module to obtain all pull-down menus currently required to be input simultaneously and pull-down options to be input respectively in the pull-down menus obtained by analysis, and simultaneously select and input each pull-down menu obtained by analysis in the pull-down menu module according to a current analysis result.

Further, the identification information of each pull-down menu is coded with a unique identification function.

The identification information of pull-down options of each pull-down menu is coded in a preset manner, and each pull-down option of the same pull-down menu has different identification information.

Further, the identification information of each pull-down menu is coded by any one or at least two of letters, numbers and other recognizable text symbols, and the identification information of each pull-down option is coded by any one or at least two of letters, numbers and other recognizable text symbols.

Further, the system also includes a prompt module connected to the analysis module.

The analysis module, before analyzing the multi-pull-down menu simultaneous input request input by the input module, is also configured to:

judge whether a format of the multi-pull-down menu simultaneous input request input by the input module is accurate:

yes, analyze the multi-pull-down menu simultaneous input request input by the input module; and no, show a user with prompt information indicating that the current multi-pull-down menu simultaneous input request is input erroneously through the prompt module.

In a third aspect, the present application provides a page form, integrated thereon with the system for simultaneously inputting a plurality of pull-down menus described above.

Further, the system for simultaneously inputting a plurality of pull-down menus also includes a prompt module connected to the analysis module.

The analysis module, before analyzing the multi-pull-down menu simultaneous input request input by the input module, is also configured to:

judge whether a format of the multi-pull-down menu simultaneous input request input by the input module is accurate:

yes, analyze the multi-pull-down menu simultaneous input request input by the input module; and no, show a user with prompt information indicating that the current multi-pull-down menu simultaneous input request is input erroneously through the prompt module.

The beneficial effects of the present invention are as follows:

According to the page form, and the method and system for simultaneously inputting a plurality of pull-down menus provided by the present application, a multi-pull-down menu simultaneous input request can be input, the input multi-pull-down menu simultaneous input request can be analyzed to obtain all pull-down menus currently required to be input simultaneously and pull-down options to be input respectively in the pull-down menus obtained by analysis, and then each pull-down menu obtained by analysis can be simultaneously selected and input. It can be seen that the input of a plurality of pull-down menus can be completed at once, thereby avoiding the use of a mode of clicking and inputting each pull-down menu one by one, and helping to improve the working efficiency of consumers or users to some extent. In addition, the impatience and tiredness of consumers or users caused by clicking and inputting a plurality of pull-down menus one by one is also avoided to some extent, and the user experience is enhanced.

In addition, the present application has a reliable design principle, a simple structure, and a very broad application prospect.

BRIEF DESCRIPTION OF THE DRAWINGS

In order to more clearly illustrate the technical solutions in the embodiments of the present application or the existing art, the drawings needing to be used in the description of the embodiments or the prior art will be briefly introduced below, and it would be obvious for a person of ordinary skill in the art to obtain other drawings according to these drawings without involving any inventive effort.

DETAILED DESCRIPTION OF THE INVENTION

In order to make a person skilled in the art better understand the technical solutions in the present application, the technical solutions in the embodiments of the present application will be clearly and completely described below with reference to the drawings in the embodiments of the present application. It is obvious that the described embodiments are only some embodiments of the present application, rather than all the embodiments. All other embodiments obtained by a person of ordinary skill in the art based on the embodiments in the present application without involving inventive efforts should fall within the scope of protection of the present application.

Key terms appearing in the present application are explained below.

Embodiment 1

Figure 1:
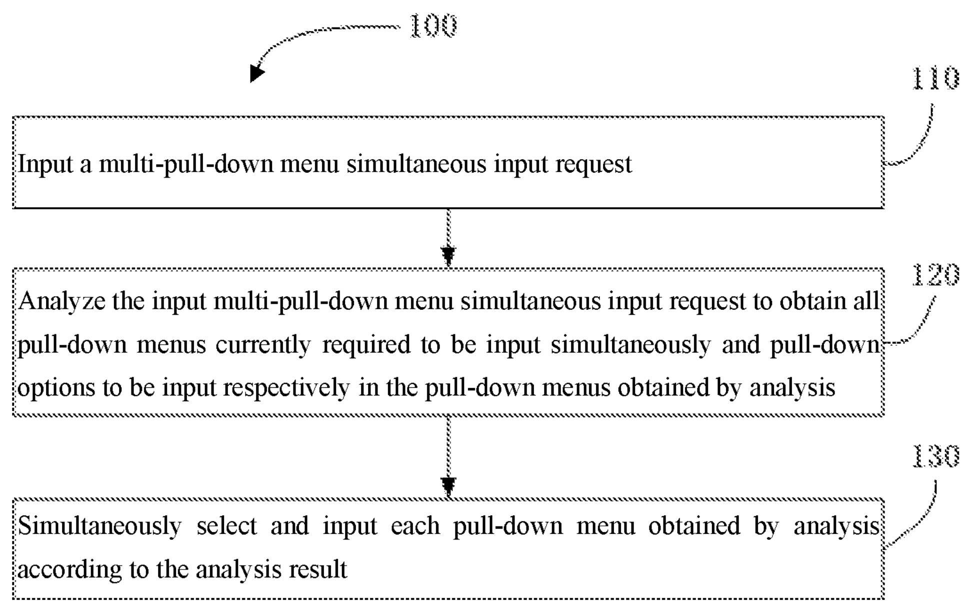
FIG. 1 is a schematic flowchart of a method according to an embodiment of the present application.

FIG. 1 is a schematic flowchart of a method according to an embodiment of the present application.

The method 100 is based on a group of pull-down menus. Each of the pull-down menus is provided with a corresponding number of pull-down options. Each of the pull-down menus is provided with identification information. The pull-down options of each of the pull-down menus are provided with identification information by one-to-one correspondence.

As shown in FIG. 1, the method 100 includes the following steps.

In step 110, a multi-pull-down menu simultaneous input request is input.

In step 120, the input multi-pull-down menu simultaneous input request is analyzed to obtain all pull-down menus currently required to be input simultaneously and pull-down options to be input respectively in the pull-down menus obtained by analysis.

In step 130, each pull-down menu obtained by analysis is simultaneously selected and input according to the analysis result.

When in use, a multi-pull-down menu simultaneous input request is firstly input. Then, the input multi-pull-down menu simultaneous input request is analyzed to obtain all pull-down menus currently required to be input simultaneously and pull-down options to be input respectively in the pull-down menus obtained by analysis. And then, each pull-down menu obtained by analysis is simultaneously selected and input according to the analysis result. It can be seen that according to the method for simultaneously inputting a plurality of pull-down menus in the present application, the simultaneous input of a plurality of pull-down menus prevents from clicking and selecting pull-down options of all pull-down menus currently required to be input, saves input time spent by users in inputting a plurality of pull-down menus to some extent, and helps to improve the working efficiency of users.

In step 110, the multi-pull-down menu simultaneous input request includes identification information of each pull-down menu currently required to be input simultaneously, and identification information of corresponding pull-down options required to be input respectively in each pull-down menu currently required to be input simultaneously.

Preferably, the identification information of each pull-down menu is coded with a unique identification function for realizing the differentiation of the pull-down menus, and the identification information of the pull-down options of each pull-down menu is coded in a preset manner. Each pull-down option of the same pull-down menu is provided with different identification information for realizing the difference and unique identification between different pull-down options of the same pull-down menu.

Preferably, the identification information of each pull-down menu may be coded by any one or at least two of letters, numbers and other recognizable text symbols, and the identification information of each pull-down option may be coded by any one or at least two of letters, numbers and other recognizable text symbols.

In order to facilitate the understanding of the present application, the method for simultaneously inputting a plurality of pull-down menus provided in the present application is further described below according to the principle of the method for simultaneously inputting a plurality of pull-down menus of the present application in conjunction with the process of simultaneously inputting a plurality of pull-down menus in the present embodiment, taking the input of eight pull-down menus as an example.

Eight pull-down menus are provided with letter codes A, B, C, D, E, F, G and H by one-to-one correspondence. Each of the eight pull-down menus is provided with six pull-down options. The six pull-down options of each pull-down menu are provided with number codes 1, 2, 3, 4, 5 and 6 by one-to-one correspondence.

A multi-pull-down menu simultaneous input request: A1B2C3D4E5F6G1H2 is input.

The input multi-pull-down menu simultaneous input request "A1B2C3D4E5F6G1H2" is analyzed to obtain that all pull-down menus currently required to be input simultaneously are pull-down menus respectively corresponding to letter codes A, B, C, D, E, F, G and H, and obtain that a pull-down option to be input in a pull-down menu (hereinafter referred to as a "pull-down menu A") corresponding to the letter node A is a pull-down option, with a number code 1, of the pull-down menu A, a pull-down option to be input in a pull-down menu (hereinafter referred to as a "pull-down menu B") corresponding to the letter node B is a pull-down option, with a number code 2, of the pull-down menu B, a pull-down option to be input in a pull-down menu (hereinafter referred to as a "pull-down menu C") corresponding to the letter node C is a pull-down option, with a number code 3, of the pull-down menu C, a pull-down option to be input in a pull-down menu (hereinafter referred to as a "pull-down menu D") corresponding to the letter node D is a pull-down option, with a number code 4, of the pull-down menu D, a pull-down option to be input in a pull-down menu (hereinafter referred to as a "pull-down menu E") corresponding to the letter node E is a pull-down option, with a number code 5, of the pull-down menu E, a pull-down option to be input in a pull-down menu (hereinafter referred to as a "pull-down menu F") corresponding to the letter node F is a pull-down option, with a number code 6, of the pull-down menu F, a pull-down option to be input in a pull-down menu (hereinafter referred to as a "pull-down menu G") corresponding to the letter node G is a pull-down option, with a number code 1, of the pull-down menu G, and a pull-down option to be input in a pull-down menu (hereinafter referred to as a "pull-down menu H") corresponding to the letter node H is a pull-down option, with a number code 2, of the pull-down menu H.

The pull-down options respectively corresponding to the pull-down menus A, B, C, D, E, F, G and H obtained by analysis are simultaneously selected and input according to the analysis result. That is, the following operations are performed in parallel: selecting the pull-down option with a number code 1 for the pull-down menu A, selecting the pull-down option with a number code 2 for the pull-down menu B, selecting the pull-down option with a number code 3 for the pull-down menu C, selecting the pull-down option with a number code 4 for the pull-down menu D, selecting the pull-down option with a number code 5 for the pull-down menu E, selecting the pull-down option with a number code 6 for the pull-down menu F, selecting the pull-down option with a number code 1 for the pull-down menu G, and selecting the pull-down option with a number code 2 for the pull-down menu H. So far, the simultaneous input of a corresponding number of pull-down options of pull-down menus corresponding to the multi-pull-down menu simultaneous input request "A1B2C3D4E5F6G1H2" is completed, thereby preventing from clicking and selecting the pull-down options of the pull-down menus A, B, C, D, E, F, G and H one by one for input. It can be seen that the input time of the pull-down options of the pull-down menus A, B, C, D, E, F, G and H is shortened to some extent.

Embodiment 2

Figure 2:
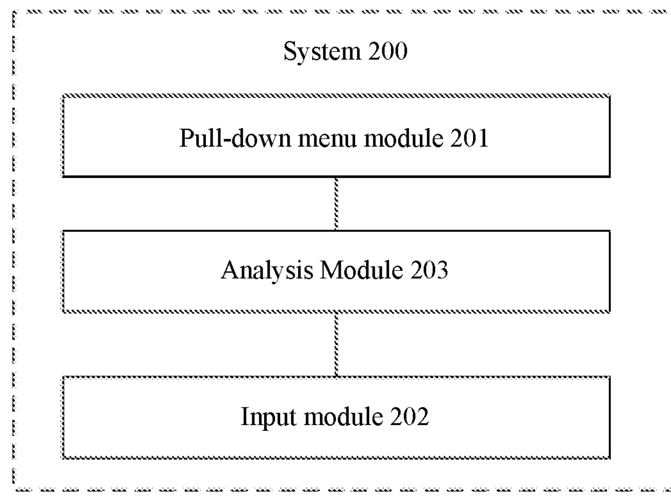
FIG. 2 is a schematic block diagram of a system according to an embodiment of the present application.

FIG. 2 is a schematic block diagram of a system according to an embodiment of the present application.

As shown in FIG. 2, the system 200 includes:

a pull-down menu module 201, including a group of pull-down menus, each provided with a corresponding number of pull-down options and identification information, the pull-down options of each pull-down menu being provided with identification information by one-to-one correspondence;

an input module 202, configured to input a multi-pull-down menu simultaneous input request, including identification information of each pull-down menu currently required to be input simultaneously, and identification information of corresponding pull-down options required to be input respectively in each pull-down menu currently required to be input simultaneously; and an analysis module 203, connected to the input module 202 and the pull-down menu module 201 respectively, and configured to analyze the multi-pull-down menu simultaneous input request input by the input module 202 to obtain all pull-down menus currently required to be input simultaneously and pull-down options to be input respectively in the pull-down menus obtained by analysis, and simultaneously select and input each pull-down menu obtained by analysis in the pull-down menu module 201 according to a current analysis result.

When the system 200 is used, a user inputs a multi-pull-down menu simultaneous input request through the input module 202, the analysis module 203 then analyzes the multi-pull-down menu simultaneous input request input by the user through the input module 202 to obtain all pull-down menus currently required to be input simultaneously and pull-down options to be input respectively in all the pull-down menus obtained by analysis, and each pull-down menu obtained by analysis is selected and input in parallel in the pull-down menu module 201.

The identification information of each pull-down menu is coded with a unique identification function, the identification information of pull-down options of each pull-down menu is coded in a preset manner, and each pull-down option of the same pull-down menu has different identification information. The identification information of each pull-down menu may be coded by any one or at least two of letters, numbers and other recognizable text symbols, and the identification information of each pull-down option may be coded by any one or at least two of letters, numbers and other recognizable text symbols. In the present embodiment, the identification information of each pull-down menu is coded with letters, and the identification information of each pull-down option is coded with numbers, which is easy to implement.

The system 200 described in the present embodiment corresponds to the method 100 described in Embodiment 1, and the components of the system 200 described in the present embodiment have been correspondingly described in Embodiment 1 and will not be described again.

In addition, in view of that the system 200 described in the present embodiment corresponds to the method 100 described in Embodiment 1, the technical effects that can be achieved by the present embodiment may be referred to the description of Embodiment 1 and will not be described in detail herein.

Embodiment 3

The present embodiment provides a page form, integrated thereon with the system for simultaneously inputting a plurality of pull-down menus described in Embodiment 2.

Figure 3:
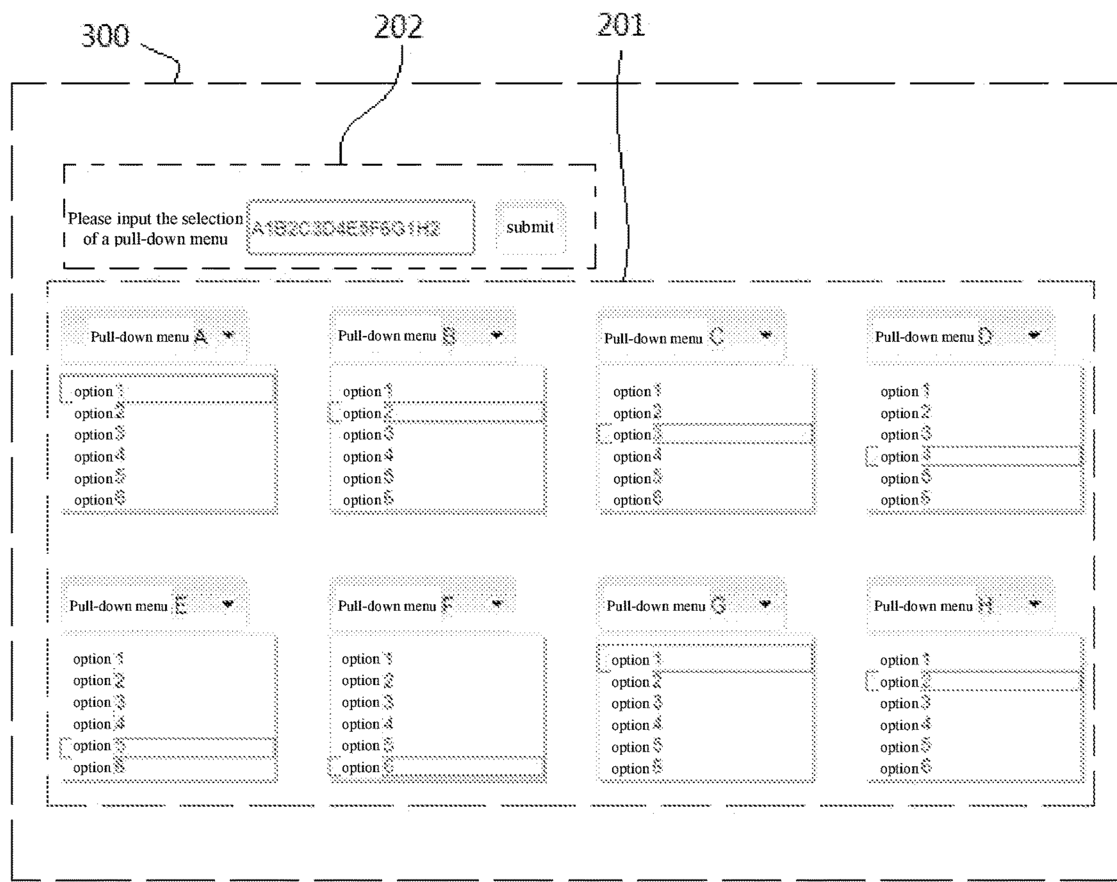
FIG. 3 is a schematic diagram of a use state of a page form according to an embodiment of the present application.

Taking the example that the pull-down menu module 201 includes the pull-down menus A, B, C, D, E, F, G and H described in Embodiment 1, a schematic diagram of a use state of the page form (i.e. a structure indicated by reference numeral 300 in FIG. 3) in the present embodiment is shown in FIG. 3. The “options” shown in FIG. 3 are all the “pull-down options” described in the present application.

A person skilled in the art, according to the written records in the prior art and the present description, would readily be able to implement the page form, and the description thereof is not repeated here. The technical effects that can be achieved by the present embodiment may be referred to the description above and will not be described in detail herein.

Embodiment 4

Figure 4:
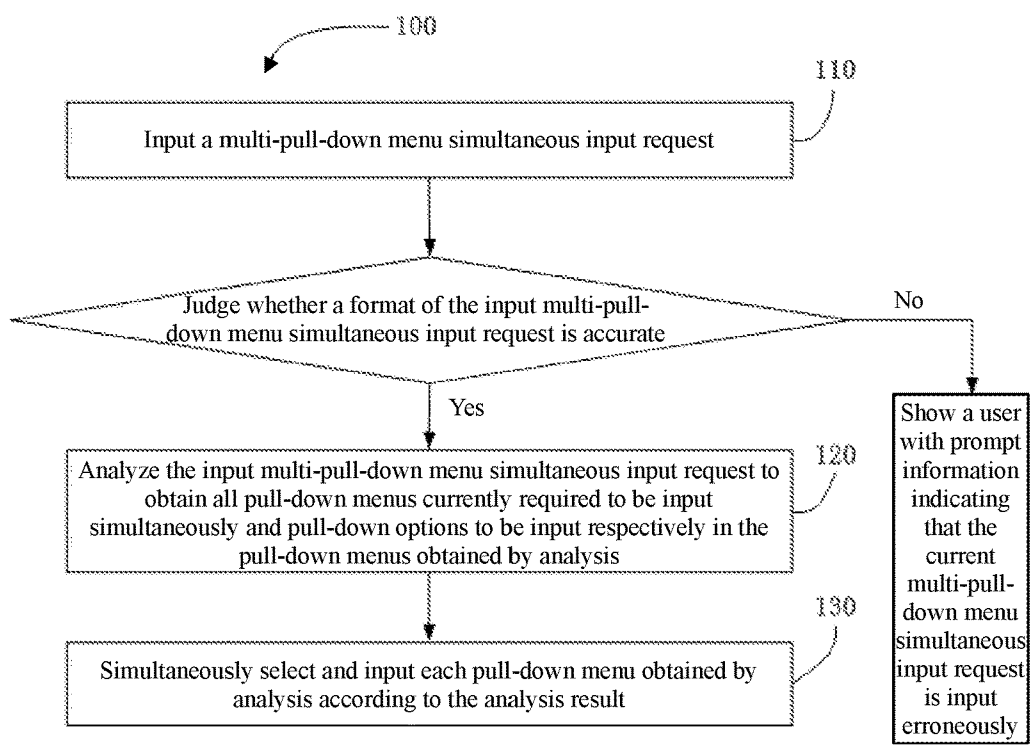
FIG. 4 is a schematic flowchart of a method according to another embodiment of the present application.

FIG. 4 is another embodiment of the method according to the present application.

Referring to FIG. 4, the present embodiment differs from Embodiment 1 in that the method 100 in the present embodiment, before analyzing the input multi-pull-down menu simultaneous input request, further includes the following steps: judging whether a format of the input multi-pull-down menu simultaneous input request is accurate:

yes, analyzing the input multi-pull-down menu simultaneous input request; and no, showing a user with prompt information indicating that the current multi-pull-down menu simultaneous input request is input erroneously.

For example, a format requirement M of a preset multi-pull-down menu simultaneous input request is as follows: a format of the multi-pull-down menu simultaneous input request is a combined sequence formed by a series of small sequences arranged in sequence without a space, and each small sequence corresponds to a pull-down menu i to be input, which is composed of pull-down menu identification information i and pull-down option identification information to be input in a pull-down menu corresponding to the pull-down menu identification information i arranged in sequence without a space. Based on this, for example on the basis of Embodiment 1: if a pull-down option 1 of a pull-down menu A is input in the pull-down menu A while a pull-down option 2 of a pull-down menu B is input in the pull-down menu B, a multi-pull-down menu simultaneous input request input correspondingly is “A1B2”.

At this moment, the description is continued by taking “A1B2C3D4E5F6G1H2” in Embodiment 1 as an example:

If the input multi-pull-down menu simultaneous input request is “A1B2C3D4E5F6G1H2”, the input request “A1B2C3D4E5F6G1H2” is analyzed.

If the input multi-pull-down menu simultaneous input request is “A1, B2, C3, D4, E5, F6, G1, H2”, a user is shown with prompt information indicating that the current multi-pull-down menu simultaneous input request is input erroneously.

The error prompt information may be “there is a space or an unrecognized text symbol or an illegal pull-down menu or an illegal pull-down option in input information”, so as to facilitate the user to modify by referring to the prompt information.

Embodiment 5

Figure 5:
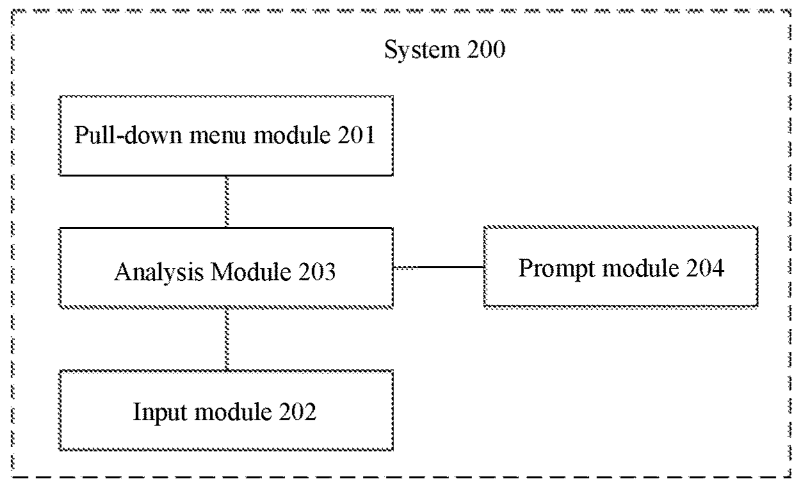
FIG. 5 is a schematic block diagram of a system according to another embodiment of the present application.

FIG. 5 is another embodiment of the system according to the present application.

Referring to FIG. 5, the present embodiment differs from Embodiment 1 in that the system 200 in the present embodiment also includes a prompt module 204 connected to the analysis module 203.

The analysis module 203, before analyzing the multi-pull-down menu simultaneous input request input by the input module 202, is also configured to:

judge whether a format of the multi-pull-down menu simultaneous input request input by the input module 202 is accurate:

yes, analyze the multi-pull-down menu simultaneous input request input by the input module 202; and no, show a user with prompt information indicating that the current multi-pull-down menu simultaneous input request is input erroneously through the prompt module.

The system 200 described in the present embodiment corresponds to the method 100 described in Embodiment 4, and the technical effects that can be achieved by the present embodiment may be referred to the description above and will not be described in detail herein.

Embodiment 6

Figure 6:
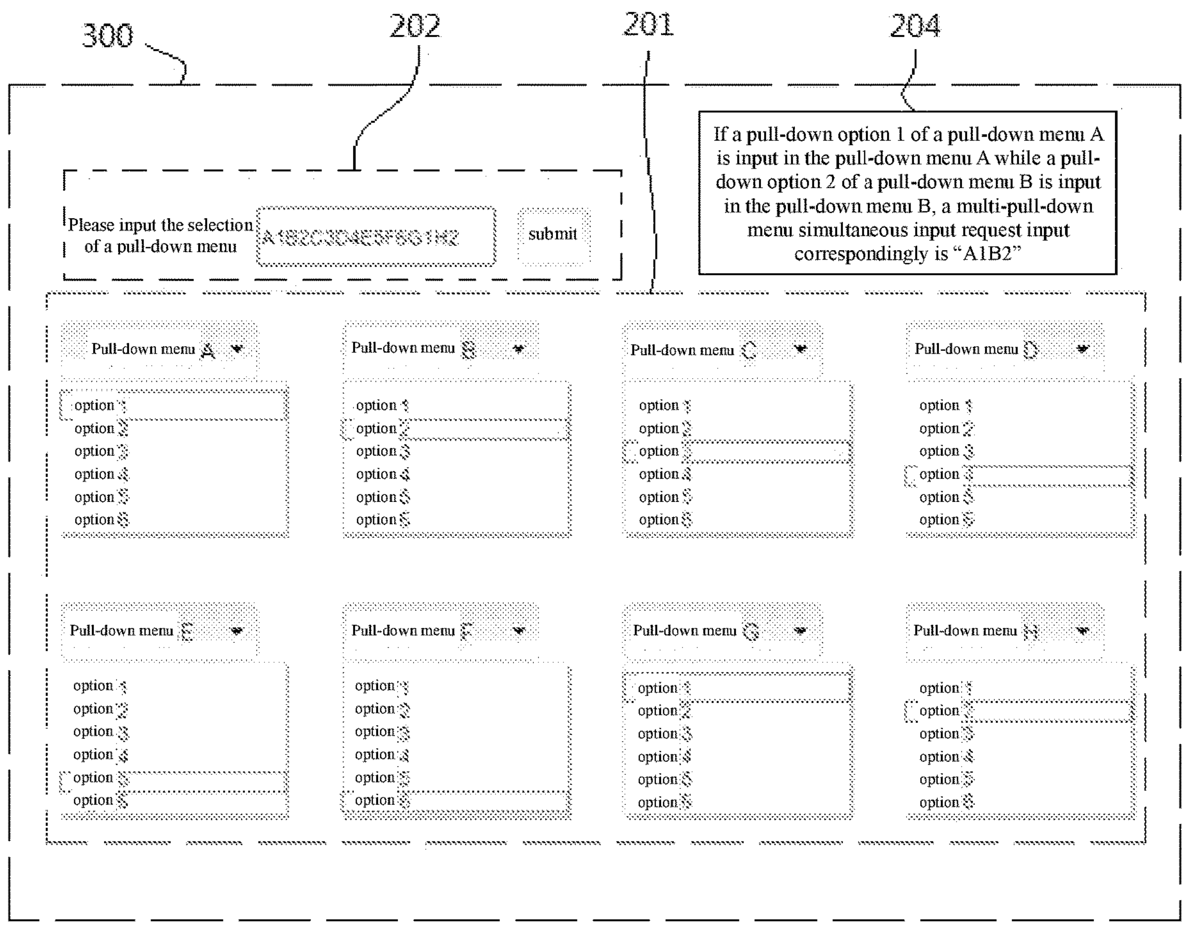
FIG. 6 is a schematic diagram of a use state of a page form according to an embodiment of the present application.

FIG. 6 is a state diagram of a page form according to an embodiment of the present application.

As shown in FIG. 6, the page form 300 is integrated thereon with the system for simultaneously inputting a plurality of pull-down menus described in Embodiment 5.

A person skilled in the art, according to the written records in the prior art and the present description, would readily be able to implement the page form, and the description thereof is not repeated here. The technical effects that can be achieved by the present embodiment may be referred to the description above and will not be described in detail herein.

It should be noted that reference will be made to the same or similar parts throughout the various embodiments in the present description. Although the present application has been described in detail in connection with the preferred embodiments with reference to the accompanying drawings, the present application is not limited thereto. Various equivalent modifications or alterations to the embodiments of the present application may be made by a person skilled in the art without departing from the spirit and essence of the present application, and all such modifications or alterations are intended to be within the scope of the present application/any person skilled in the art may readily conceive of changes or alterations within the technical scope disclosed in the present application, which should be all within the scope of protection of the present application. Therefore, the scope of protection of the present application should be subject to the scope of protection of the claims.

What is claimed is:

1. A method being based on a group of displayed pull-down menus and a separate displayed simultaneous input selection box, each of the group of displayed pull-down menus being provided with a corresponding number of pull-down options, each of the pull-down menus being provided with identification information, and the pull-down options of each of the pull-down menus being provided with identification information by one-to-one correspondence, the method comprising:

inputting into the simultaneous input selection box, a multi-pull-down menu simultaneous input request to select a plurality of the pull-down options, comprising identification information of each displayed pull-down menus, and identification information of corresponding pull-down options;

analyzing the multi-pull-down menu simultaneous input request to obtain all pull-down menus currently required to be input simultaneously and pull-down options to be input respectively in each of the group of displayed pull-down menus; and simultaneously selecting and inputting each of the group of displayed pull-down menus.

2. The method according to claim 1, wherein the identification information of each pull-down menu is coded with a unique identification function; and the identification information of pull-down options of each pull-down menu is coded in a preset manner, and each pull-down option of a same pull-down menu has different identification information.

3. The method according to claim 2, wherein the identification information of each pull-down menu is coded by any one or more of letters, numbers, and other recognizable text symbols, and the identification information of each pull-down option is coded by any one or more of letters, numbers, and other recognizable text symbols.

4. The method for simultaneously inputting a plurality of pull-down menus according to claim 3, further comprising:

judging whether a format of the input multi-pull-down menu simultaneous input request is accurate:

when the format of the multi-pull-down menu simultaneous input request is inaccurate, showing a user prompt information indicating that a current multi-pull-down menu simultaneous input request is input erroneously.

5. The method for simultaneously inputting a plurality of pull-down menus according to claim 2, further comprising:

judging whether a format of the input multi-pull-down menu simultaneous input request is accurate:

when the format of the multi-pull-down menu simultaneous input request is inaccurate, showing a user prompt information indicating that a current multi-pull-down menu simultaneous input request is input erroneously.

6. The method according to claim 1, further comprising:

judging whether a format of the input multi-pull-down menu simultaneous input request is accurate:

when the format of the multi-pull-down menu simultaneous input request is inaccurate, showing a user prompt information indicating that a current multi-pull-down menu simultaneous input request is input erroneously.

* * * * *